June 14, 1966 R. L. SMITH 3,255,815
HEAT EXCHANGER AND MIXER
Filed March 6, 1964 2 Sheets-Sheet 1
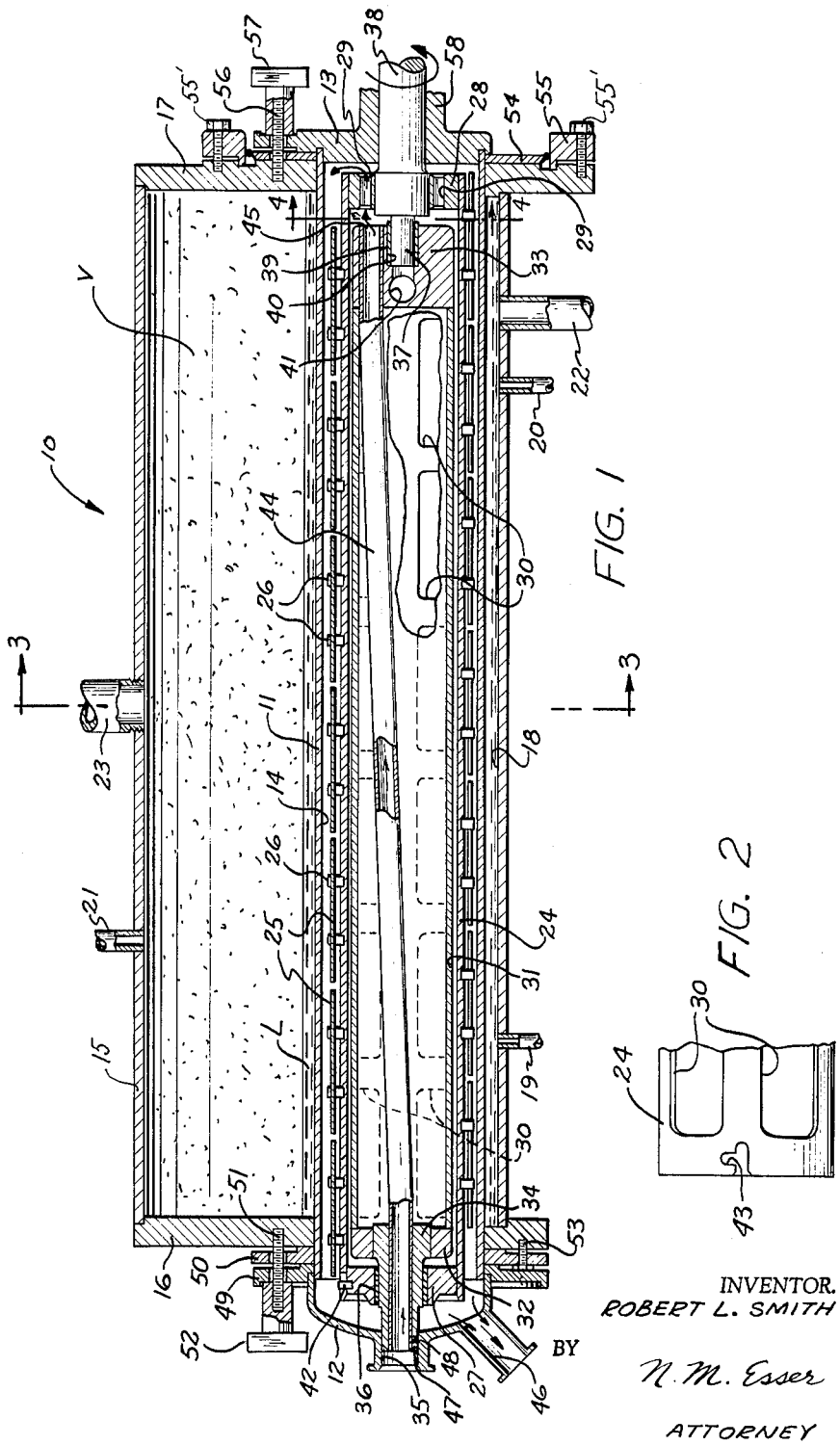
INVENTOR.
ROBERT L. SMITH
BY
N. M. Esser
ATTORNEY INVENTOR.
ROBERT L. SMITH
BY
N. M. Esser
ATTORNEY

United States Patent Office 3,255,815
Patented June 14, 1966

3,255,815
HEAT EXCHANGER AND MIXER
Robert L. Smith, Louisville, Ky., assignor to Chemetron Corporation, Chicago, Ill., a corporation of Delaware
Filed Mar. 6, 1964, Ser. No. 349,926
6 Claims. (Cl. 165—94)

This invention relates to a heat exchanger for flowable materials.

It is a feature of the invention to provide a heat exchanger including a rotor disposed in a product chamber and having an apertured plate, with mixing elements mounted on the rotor, and being so constructed and arranged that flowable materials are passed through one end of the product chamber and are passed through the apertured plate for initial mixing and thereafter the materials are further mixed by the mixing elements before they are discharged through that end of the product chamber.

It is another feature of the invention to provide a heat exchanger for flowable materials having closed ends and including a rotor having a plurality of ports, with the rotor carrying a plurality of scraper blades for scraping the inner surface of a surrounding heat transfer member, and with a non-circular tubular baffle disposed within the rotor so that flowable materials are forced through the ports and are deflected by the baffle as the rotor rotates, with a conduit providing communication through one end of the heat exchanger and extending through the baffle throughout its entire length with the heat exchanger having an outlet for materials at that one end.

In the drawings:

FIGURE 1 is an elevational view, mainly in section, showing a heat exchanger in accordance with the invention;

FIGURE 2 is a fragmentary view of a rotor shown in FIGURE 1;

Figure 3:
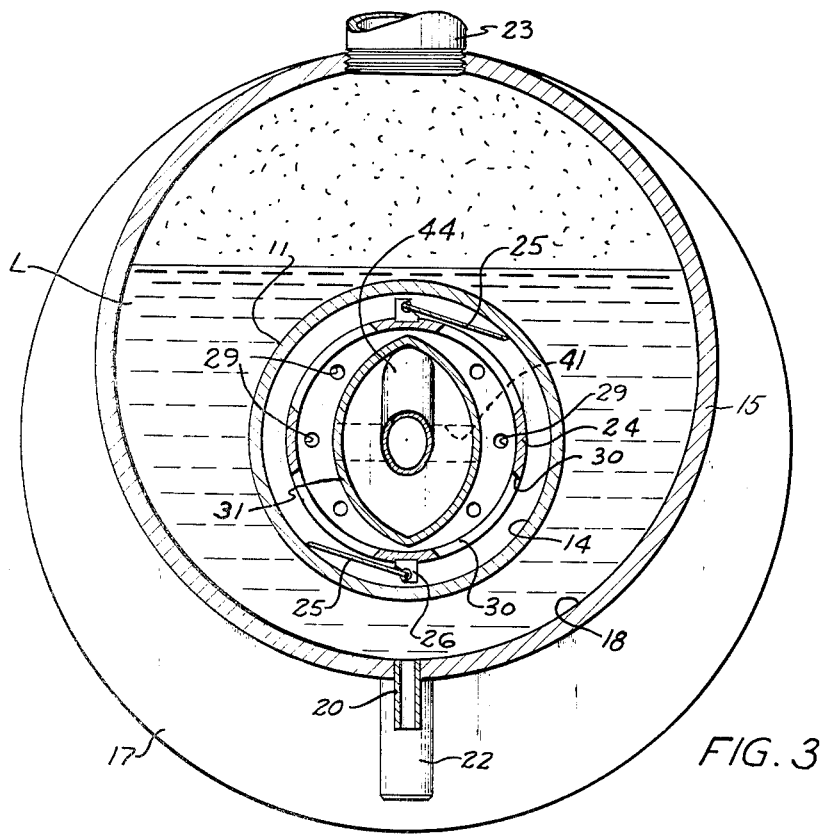
FIGURE 3 is an enlarged sectional view taken along lines 3—3 of FIGURE 1.
Figure 4:
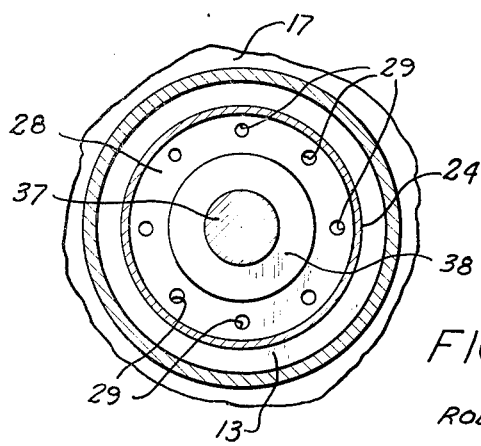
FIGURE 4 is an enlarged sectional view taken along line 4—4 of FIGURE 1.

In the drawings, there is shown a heat exchanger generally indicated at 10. The heat exchanger 10 includes a heat transfer member 11 having its ends closed off by end plates 12 and 13 to define a product chamber 14. The heat transfer member 11 is shown to be tubular and to be circular in transverse section. Surrounding the heat transfer member 11 is a shell 15 having its ends closed off by end plates 16 and 17 to define a heat transfer chamber 18. A liquid heat transfer medium L for example a refrigerant or a heating medium, as the case may be, in the chamber 18 is in heat exchange relationship with the heat transfer member 11. The heat transfer medium L can be admitted into the chamber 18 through conduits 19, 20 and 21 and discharged through a conduit 22, while any vapor V can be withdrawn from the chamber 18 through a conduit 23. Any other suitable means for passing a heat exchange medium into heat exchange relationship with the heat transfer member 11 can be used.

A tubular rotor 24 disposed within the product chamber 14 has mixing elements in the form of scraper blades 25 pivotally mounted on its outer surface by mounting members 26. The scraper blades 25 are preferably relatively short and arranged in two opposed rows. The scraper blades 25 scrape the inner surface of the heat transfer member 11 as the rotor 24 rotates. The rotor 24 has end plates 27 and 28. The end plate 28 is shown to have a plurality of apertures 29. The rotor 24 has a plurality of ports 30 along its length through which the flowable materials pass as the rotor 24 rotates.

Disposed within the tubular rotor 24 is a generally tubular baffle 31 closed at its ends by end plates 32 and 33. The entire outer surface of the baffle 31 is convex to prevent materials from becoming lodged on its surface; the maximum distance measured across the baffle 31 in one direction is substantially greater than the minimum distance measured across the baffle 31 in another direction, as best shown in FIGURE 3. A stub shaft 34 secured to the end plate 32 of the baffle 31 extends through the end plate 27 of the rotor 24 into an inlet passage 35 in the end plate 12. A sleeve bearing 36, secured to the stub shaft 34, journals the end plate 27. A stub end 37 of a drive shaft 38 is journalled in a sleeve bearing 39. The sleeve bearing 39 is secured in a bore 40 in the end plate 33. The bore 40 opens into a transverse bore 41, having open ends, in the end plate 33.

A pin 42 secured to the end plate 27 fits into a slot 43 in the rotor 24 to removably connect the rotor 24 to its end plate 27.

A conduit 44 extends from within the inlet opening 35 of the end plate 12, through the stub shaft 34, and through the entire length of the baffle 31. The conduit 44 has an open end 45 through which flowable materials can be discharged toward the apertures 29 in the end plate 28 of the rotor 24. Clearance is provided between the end plate 28 and the end plate 13 so that materials passing through the apertures 29 can flow into the chamber 14 between the rotor 24 and the surrounding heat transfer member 11. After the materials have passed completely through the chamber 14, they are discharged through a discharge outlet 46 in the end plate 12.

Rotation of the baffle 31 can be prevented by any suitable means, for example by providing a lug 47, secured to the end plate 12, which fits into a cutout 48 in the stub shaft 34.

Three spaced arms 49, only one of which is shown, extend outwardly from the end plate 12. A collar 50 encircles one end of the heat transfer member 11 and is sandwiched between the end plate 16 and the arms 49. Three spaced threaded studs, 51, only one of which is shown, are threaded into the end plate 16. Nuts 52 can be threaded onto the studs 51 to hold the end plate 12 in position. Screws 53, only one of which is shown, hold the collar 50 to the end plate 16.

A collar 54 is welded to an annular ring 55 which is secured to the end plate 17 by screws 55'. Three equally spaced threaded studs 56, only one of which is shown, are threaded into the end plate 17 and pass through the collar 54. Nuts 57 can be threaded onto the studs 56 to hold the end plate 13 in position. The end plate 13 has an extension 58 which is directly connected to a speed reducer (not shown) for a motor (not shown).

In use, flowable materials to be processed are passed under pressure into the conduit 44 and are discharged through its open end 45 and toward the end plate 28. Because the rotor 24 is rotating, the apertures 29 in its end plate 28 are sequentially brought into substantial alignment with the open end 45. Some of the discharged materials impinge against the end plate 28 but do not pass through the apertures 29. Thus, some of the materials flow along the baffle 31 inwardly of the rotor 24 until they have traveled far enough to pass through the ports 30. The materials which do not pass through the apertures 29 thus reverse their direction of flow. The discharged materials which pass through, and more particularly are extruded through, the apertures 29 also reverse their direction of flow as they pass into the chamber 14 between the heat exchange member 11 and the rotor 24. Due to the shape of the baffle 31, the materials in the chamber 14 between the heat transfer member 11 and the baffle 31 move continuously into and out of the ports 30 in the rotor 24 as the rotor 24 rotates. Such in and out movement results because the volume between each row of blocks 25 and the baffle 31 increases and decreases continuously as the rotor 24 rotates; the baffle 31 causes the materials to be continuously deflected, thus causing intense mixing and kneading of the materials. The materials can pass through the discharge outlet 46 only after passing through the entire length of the chamber 14.

In the event the materials in the chamber 14 are to be cooled, a refrigerant is supplied to the chamber 18. The relatively warm materials passing through the conduit 44 heat the conduit 44 which in turn heats the baffle 31 throughout its entire length to prevent materials from freezing to the exterior surface of the baffle 31. Because the baffle 31 is liquid tight, no materials from within the chamber 14 can find their way into and become lodged in the interior of the baffle 31.

The bore 41 which has a relatively large diameter allows the exit of any materials which might otherwise tend to accumulate between the stub end 37 and the sleeve bearing 39.

By the way of example but not limitation, the conduit 44 has an inside diameter of about one inch and the apertures 29 have diameters of about five-eighths of an inch; the baffle 31 has a maximum transverse dimension of about four and one-quarter inches and a minimum transverse dimension of about three inches.

Other embodiments and modifications of this invention will suggest themselves to those skilled in the art, and all such of these as come within the spirit of this invention are included within its scope as best defined by the appended claims.

I claim:

1. In a heat exchanger for flowable materials: a generally tubular heat transfer member having closed opposed ends to define a chamber, means for passing a heat exchange medium into heat exchange relationship with the outer surface of said heat transfer member, a generally tubular rotor disposed in said chamber and having a plurality of ports, a plurality of scraper blades mounted on said rotor for scraping the inner surface of said heat transfer member as said rotor rotates, a closed generally tubular baffle disposed within said rotor so that flowable materials are forced through said ports by said scraper blades and are deflected by said baffle as said rotor rotates, a conduit providing communication through one end of said chamber and extending through said baffle and having an open end near the other end of said chamber, and a discharge outlet at said one end of said chamber.

2. In a heat exchanger for flowable materials: a generally tubular heat transfer member having closed opposed ends to define a chamber, means for passing a heat exchange medium into heat exchange relationship with the outer surface of said heat transfer member, a generally tubular rotor disposed in said chamber and having a plurality of ports, a plurality of scraper blades mounted on said rotor for scraping the inner surface of said heat transfer member as said rotor rotates, said scraper blades being relatively short and arranged in two opposed rows, and a non-circular generally tubular baffle disposed within said rotor so that flowable materials are forced through said ports by said scraper blades and are deflected by said baffle as said rotor rotates, a conduit providing communication through one end of said chamber and extending through said baffle and having an open end near the other end of said chamber, and a discharge outlet at said one end of said chamber.

3. In a heat exchanger for flowable materials: a generally tubular heat transfer member having closed opposed ends to define a chamber, means for passing a heat exchange medium into heat exchange relationship with the outer surface of said heat transfer member, a generally tubular rotor disposed in said chamber and having a plurality of ports and a pair of opposed end plates, a plurality of scraper blades mounted on said rotor for scraping the inner surface of said heat transfer member as said rotor rotates, and a baffle disposed within said rotor so that flowable materials are forced through said ports by said scraper blades and are deflected by said baffle as said rotor rotates, the entire outer surface of said baffle being convex, means providing communication through one end of said chamber and extending through said one end plate for discharging flowable materials toward said other end plate, said other end plate having at least one aperture through which at least some of the materials can pass, and an outlet for materials at said one end of said chamber.

4. In a heat exchanger for flowable materials: a generally tubular heat transfer member having closed opposed ends to define a chamber, means for passing a heat exchange medium into heat exchange relationship with the outer surface of said heat transfer member, a generally tubular rotor disposed within said chamber and having opposed end plates, mixing means carried by the outer surface of said rotor, means providing communication through one end of said chamber and extending through said one end plate for discharging flowable materials toward said other end plate, said other end plate having at least one aperture through which at least some of the materials can pass, and an outlet for materials at said one end of said chamber.

5. In a heat exchanger for flowable materials: a generally tubular heat transfer member having closed opposed ends to define a chamber, means for passing a heat exchange medium into heat exchange relationship with the outer surface of said heat transfer member, a generally tubular rotor disposed within said chamber and having a plurality of ports, mixing means carried by the outer surface of said rotor, said rotor having opposed end plates, a closed generally tubular baffle disposed within said rotor, a conduit providing communication through one end of said chamber and extending through one end plate of said rotor and through said baffle and having an open end opening toward said other end plate of said rotor, apertures in said other end plate which become sequentially aligned with said open end of said conduit as said rotor rotates so that at least some of the materials passing through said open end can be extruded through said apertures, and an outlet at said one end of said chamber.

6. In a heat exchanger for flowable materials: a generally tubular heat transfer member having closed opposed ends to define a chamber, means for passing a heat transfer medium into heat transfer relationship with the outer surface of said heat transfer member, a generally tubular rotor disposed within said chamber and having a plurality of ports and opposed end plates, mixing means carried by the outer surface of said rotor, a generally tubular baffle disposed within said rotor and having opposed end plates, one of said end plates of said baffle including a first bore having ends opening into said chamber and including a second bore communicating with said first bore, and a stub end of a shaft secured to an adjacent end plate of said rotor and being journalled in said second bore.

References Cited by the Examiner

UNITED STATES PATENTS 2,281,944   5/1942   Miller et al. _____ 62—354 XR

FOREIGN PATENTS 574,872   3/1958   Italy.

ROBERT A. O'LEARY, *Primary Examiner.*

N. R. WILSON, *Assistant Examiner.*